United States Patent [19]
Bodar et al.

[11] Patent Number: 6,010,175
[45] Date of Patent: Jan. 4, 2000

[54] SUN VISOR FOR VEHICLES

[76] Inventors: Andre Bodar, 6, Rue Klein, F-57690 Bambiderstroff; Marc Agro, 24, place Therdore Paque, 5-57500 Saint-Avold, both of France

[21] Appl. No.: 09/085,124

[22] Filed: May 27, 1998

[51] Int. Cl.[7] .................................................. B60J 1/02
[52] U.S. Cl. ...................................... 296/97.11; 296/97.12
[58] Field of Search ............................... 296/97.9, 97.11, 296/97.12, 97.13

[56] References Cited

U.S. PATENT DOCUMENTS

| | | | |
|---|---|---|---|
| 4,821,374 | 4/1989 | Gavagan | 296/97.9 X |
| 5,383,700 | 1/1995 | Agro et al. | 296/97.9 |

FOREIGN PATENT DOCUMENTS

| | | | |
|---|---|---|---|
| 231440 | 8/1987 | European Pat. Off. | 296/97.11 |
| 0 499 020 B1 | 9/1994 | European Pat. Off. | |
| 41 04 032 C1 | 4/1992 | Germany . | |
| 4234760 | 4/1994 | Germany | 296/97.12 |

*Primary Examiner*—D. Glenn Dayoan
*Assistant Examiner*—Chad Wells
*Attorney, Agent, or Firm*—Harness, Dickey & Pierce, P.L.C.

[57] ABSTRACT

This invention relates to a sun visor having a sun visor body which is pivotable about, and displaceable on, a spindle. The spindle is seated in a rotatable, but non-displaceable, manner in a sliding body. The sliding body is mounted in a non-rotatable, but displaceable, manner by a tubular hollow body. The hollow body is embedded in the sun visor body. In order to fulfill the required specification with respect to the radial play and the sliding force between the hollow body and the sliding body, it is provided that the sliding body is formed from a modified molybdenum-enriched POM and has a cutout which is open at the bottom. A compression spring and a slowing-down block are disposed within the cutout. The slowing-down block is subjected to the action of the spring and is supported on the bottom wall of the hollow body.

16 Claims, 2 Drawing Sheets

SUN VISOR FOR VEHICLES

BACKGROUND OF THE INVENTION

The invention relates to a sun visor for vehicles, and more particularly, to a sun visor which overcomes the difficulties in fulfilling required specifications as to radial play and sliding force between a hollow body and a sliding body disposed within the sun visor.

Sun visors are well known in the art. A sun visor of the generic type is described in DE 41 04 032 C1, which is incorporated herein by reference. Generally, a sun visor has a sun visor body which is pivoted about, and longitudinally displaceable on, a spindle. The spindle is seated in a rotatable, but non-displaceable, manner in a sliding body. The sliding body is mounted in a non-rotatable, but displaceable, manner in a tubular hollow body.

In practical use, the known sun visor has proven to be in need of further improvement. The main improvement needed is to overcome particular difficulties in fulfilling the required specification with respect to radial play and sliding force between the hollow body and the sliding body. In particular, excessive radial play caused by tolerances between the hollow body and the sliding body can easily result in an undesired adjustment of the sun visor body. Trials in keeping the amount of radial play small have shown that, even if tolerances are complied with, the sliding forces cannot reliably be controlled. Often, either the sliding forces were too high (at room temperature) or too low (following heat aging) for customer requirements. This circumstance can probably be attributed to the different coefficients of expansion between the tubular hollow body, which is made of metal, and the sliding body, which is made of plastic.

Accordingly, one object of the present invention is to provide a sun visor which allows the specification which is required by the customers with respect to radial play and sliding force between the hollow body and the sliding body to be fulfilled under both hot and cold conditions.

SUMMARY OF THE INVENTION

One aspect of the present invention provides a sun visor for vehicles which includes a sun visor body, a spindle, a sliding body and a tubular hollow body. The sun visor body is pivotable about and longitudinally displaceable on the spindle. The spindle is rotatable about, while also being fixed in axial displacement to, the sliding body. The sliding body is mounted in a manner to allow axial displacement of the sliding body relative to the hollow body, while also being rotationally fixed relative to the hollow body. The hollow body is embedded or disposed near one longitudinal edge of the sun visor body.

The sliding body is formed of a plastic material which is injection molded, and has an inner pressure-exerting element, which acts radially against the spindle, and outer pressure-exerting elements, which are located over the circumference of the sliding body. The outer pressure-exerting elements support the sliding body in the hollow body.

Further, an elongate metal cage is disposed within the sliding body, which accommodates the spindle and bears the pressure-exerting element which acts against the spindle. The top wall of the metal cage is rounded in accordance with the radius of the spindle. Resilient means are arranged between the base of the metal cage and the pressure-exerting element, wherein the resilient means press the pressure-exerting element against the spindle and press the spindle against the top wall of the metal cage.

The sliding body is formed from a modified molybdenum-enriched POM. Further, the sliding body has a cutout which is open at the bottom. A compression spring and a slowing-down block are disposed within the cutout. The slowing-down block is supported on the bottom wall of the hollow body and is subjected to the action of the compression spring.

It has been shown that the POM material which is used according to the invention for the sliding body has excellent sliding properties, which is important if there is insufficient radial play. It has also been shown that the spring-loaded slowing-down block which is provided according to the invention ensures that the required sliding force does not drop below the desired value. Preferably, the sliding force is about 5 N to about 15 N. This allows the desired longitudinal displacement of the sun visor body to be executed without any difficulty, while any undesired longitudinal displacement, which may occur in the event of vehicle vibrations or the action of centrifugal force, is prevented.

For producing the sliding body and achieving good sliding properties for the same, it has proven advantageous to use molybdenum POM C 9021 M.

The slowing-down block is preferably of E-shaped design with a central leg over which the compression spring grips. This means that the compression spring, which is preferably a helical compression spring, is accommodated and supported in a centered manner.

According to one configuration of the invention, the slowing-down block may be designed as a plastic injection molding and made of POM C 9021 K.

A further configuration of the invention provides that the amount of functional play between the sliding body and the tubular hollow body is smaller than 0.05 mm.

Another aspect of the invention provides a process according to the invention for producing a sun visor of the type described above comprised of the following steps:

producing a sliding body by injection molding such that the sliding body has an oversize with respect to a hollow body, fitting the sliding body with a metal cage, a slowing-down block and a compression spring, pressing the fitted sliding body into the hollow body, heating the fitted sliding body in the hollow body to about 90° C. for approximately two hours, and cooling the fitted sliding body in the hollow body to room temperature.

The oversize of the sliding body, which can be injection molded accurately to within 5/100 mm (0.05 mm), concerns the outer pressure-exerting elements. The outer pressure-exerting elements are distributed over the circumference of the sliding body and have the effect of supporting the sliding body in the hollow body. The hollow body is dimensioned such that in all cases the hollow body has tolerance fluctuations (1.5/10 mm (0.15 mm) has to be expected). The sliding body is pressed into the hollow body with a press fit. The operations of heating the assembled, fitted sliding body in the hollow body and recooling the same achieve precise adaptation in the guide-surface regions. This is attributable to the fact that the hollow body, which is a metal material, cools much more quickly than the sliding body, which is a plastic material, located in it. As a result of the shrinkage and expansion properties of the hollow body material, which is preferably aluminum, the sliding body is adapted with extreme precision to the hollow body in the regions of the guide surfaces. Following this shrinkage process of the hollow body (aluminum) part and sliding body (plastic) part, the amount of functional play between these parts is smaller than about 0.05 mm. The desired sliding force is then only achieved by the slowing-down block and the compression spring. The desired sliding force is then about 7 N to about 13 N. The measures according to the invention make it possible to achieve the required specification as regards radial play and sliding force under hot and cold conditions.

These and other objects, advantages, and features of the present invention will be better understood upon review of the following detailed description of the preferred embodiments.

DETAILED DESCRIPTION OF THE PREFERRED EMBODIMENTS

Figure 1:
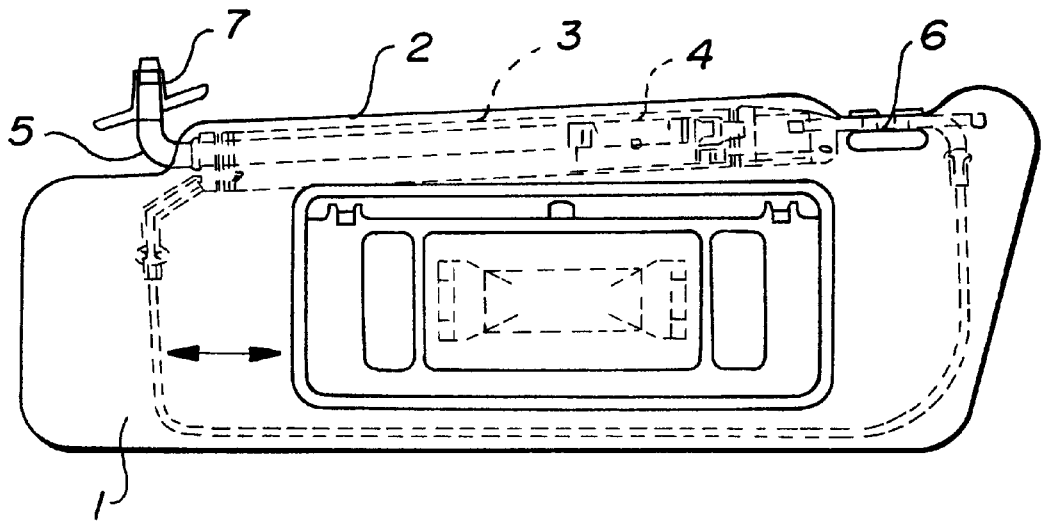
FIG. 1 illustrates an overall view of the sun visor of the present invention.

As illustrated in FIG. 1, the sun visor of the present invention comprises a sun visor body 1 which has a top longitudinal edge 2. In the region of the top longitudinal edge 2, the sun visor body 1 has a tubular hollow body 3 accommodated therein and a sliding body 4. The sliding body 4 bears a spindle 5. The spindle 5 is accommodated in an axially displaceable manner in the hollow body 3. The sun visor also has a bearing pin 6 for latching into a counter-bearing (not shown). The spindle 5 is of approximately L-shaped design, of which the long leg is accommodated by the sliding body 4 and the short leg is accommodated by a pivot-bearing support 7. The sun visor body 1 is usually arranged on the long leg of the spindle 5 in the position which can be seen from FIG. 1.

In order that the driver and front passenger of the vehicle can be protected against incident sun rays or other light sources, the sun visor body 1 is fastened on the vehicle body above the windscreen (windshield) and can be swung in front of the windscreen or pivoted to a side window. Furthermore, provision is made for a displaceable arrangement (indicated by the double arrow) of the sun visor body 1 on the long leg of the spindle, this arrangement being advantageous, in particular, when the sun visor body is located in a position in which it has been pivoted in front of a side window at the front of the vehicle.

Figure 2:
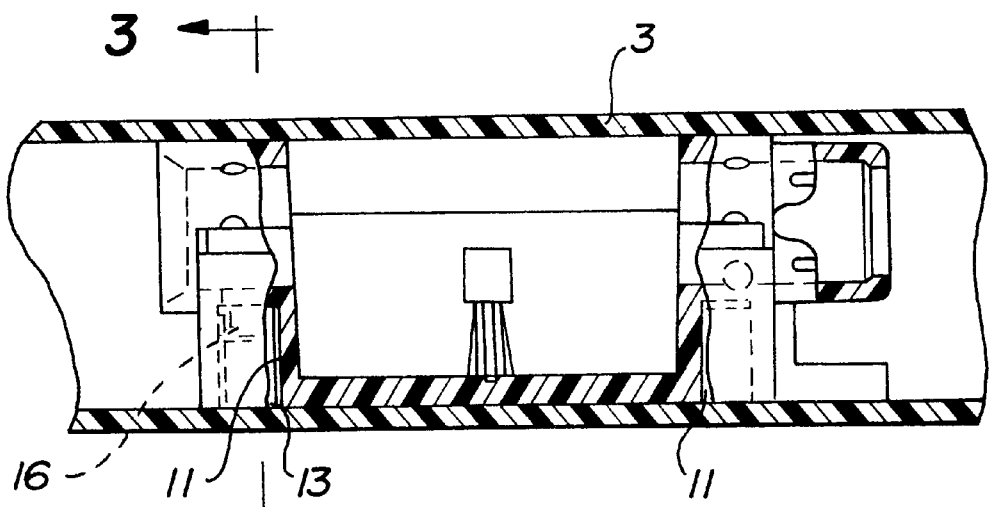
FIG. 2 illustrates a cross-sectional cut-way view of the sliding body, arranged in the hollow body, of the sun visor shown in FIG. 1.
Figure 3:
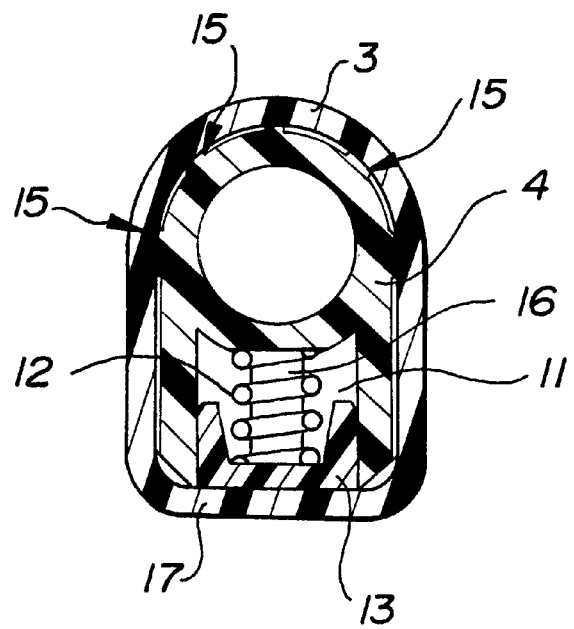
FIG. 3 illustrates a cross-sectional view along the line III—III in FIG. 2.
Figure 4:
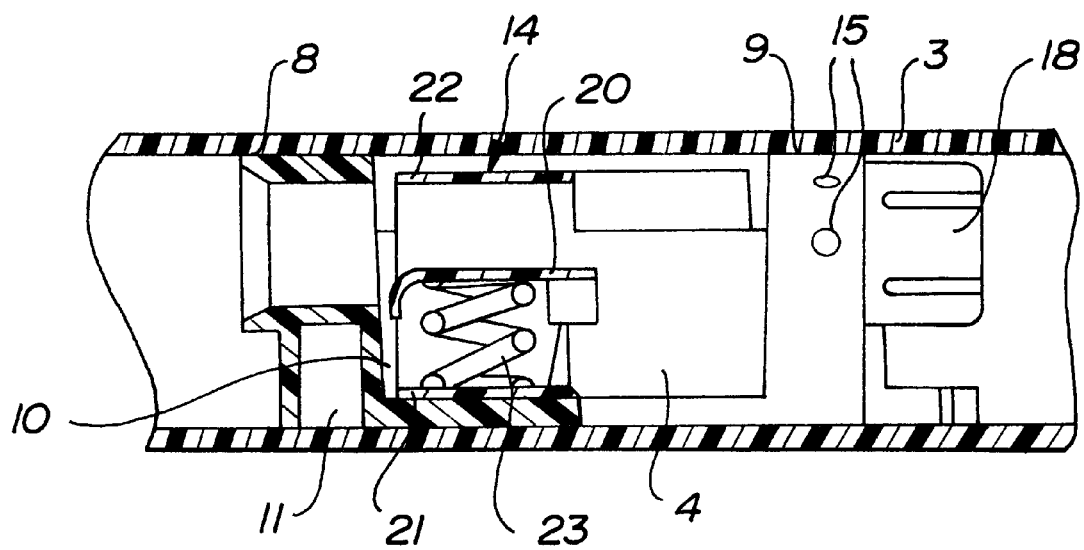
FIG. 4 illustrates a cross-sectional view of the metal cage of the sun visor body.

The sliding body 4 is illustrated in FIGS. 2 and 4 in an enlarged scale with respect to FIG. 1. The sliding body 4 is comprised of a plastic, which is injection molded. Preferably, the sliding body 4 is comprised of a modified molybdenum-enriched POM. Even more preferably, the sliding body 4 is comprised of a molybdenum POM C 9021 M. As shown in cross-section in FIG. 3, the sliding body 4 is in the form of a rectangle with a rounded top narrow side. This cross-section is adapted to that of the tubular hollow body 3. The sliding body 4 is integrally designed with pressure-exerting elements 15, which are distributed over the circumference and are in the form of protrusions. The pressure-exerting elements 15 are supported on the inner wall of the tubular hollow body 3, with the result that the frictional surface between the tubular hollow body 3 and the sliding body 4 is restricted to the pressure-exerting elements 15. The sliding body 4 is also provided with an inner pressure-exerting element, which acts radially against the spindle 5.

As shown in FIG. 4, the sliding body 4 has a front bearing eyelet 8 and a rear bearing eyelet 9 for the spindle 5. The rear bearing eyelet 9 of the sliding body 4 is adjoined by an annular clip catch 18, which serves for attaching the spindle 5 on the sliding body 4 so as to be secured against axial displacement. An elongate cavity 10 which is accessible from the outside is made between the bearing eyelets 8, 9. The cavity 10 serves for accommodating a metal cage 14, which has a base and a top wall. The elongated metal cage 14, known in the art, receives the spindle 5 and supports a pressing element 20 acting against the spindle 5. A spring 23 is disposed between the base 21 of the metal cage 14 and the pressing element 20 in order to press the pressing element against the spindle 5 and hence, the spindle is pressed against the top wall 22 of the metal cage 14. The top wall 22 is rounded according to the radius of the spindle 5 and is generally complementary thereto. In the preferred embodiment, the metal cage has a cross-section in the shape of a rectangle having a rounded narrow side. Further, the base 21 of the metal cage 14 is preferably produced as a separate plate part having laterally projecting material protrusions which engage in openings in the side walls of the metal cage. The side walls of the metal cage further include a centrally disposed slot which runs perpendicular to the longitudinal axis of the metal cage, is open in the direction of the base of the metal cage, ends in front of the end wall of the metal cage, and serves to receive lateral material projections configured on the pressing element.

As shown in FIG. 3, cutouts 11 which are open at the bottom are provided at the end regions of the sliding body 4. A compression spring 12 and a slowing-down block 13 are introduced in one of these cutouts. The slowing-down block 13 is subjected to the action of the compression spring 12 and is supported on the bottom wall 17 of the tubular hollow body 3. The slowing-down block 13 is preferably of an E-shaped design, and its central leg accommodates an end region of the helical compression spring 12. The other end of the helical compression spring 12 is supported on the base of the cutout 11, on which, for better guidance of the helical compression spring, a stub 16 may be integrally formed. Moreover, the slowing-down block 13 is adapted to the cross-section of the opening of the cutout 11, with an amount of functional play which allows relative movement. The slowing-down block 13 is comprised of an injection molded plastic. Preferably, the slowing-down block 13 is comprised of a molybdenum-enriched POM. Even more preferably, the slowing-down block 13 is comprised of a molybdenum POM 9021 K.

Following the process of shrinking the aluminum hollow body 3 and the plastic sliding body 4, the amount of functional play between the hollow body 3 and the sliding body 4 is smaller than about 0.05 mm. The desired sliding force is then only achieved by the slowing-down block 13 and the compression spring 12. The desired sliding force is then about 7 N to about 13 N.

Of course, it should be understood that a wide range of changes and modifications can be made to the embodiments described above. It is therefore intended that the foregoing description illustrates rather than limits this invention, and that it is the following claims, including all equivalents, which define this invention.

What is claimed is:

1. A sun visor for vehicles comprising:

a sun visor body having a longitudinal edge;

a spindle, said sun visor body being pivotable about and longitudinally displaceable on said spindle;

a sliding body being rotatable about said spindle and said sliding body being secured against axial displacement relative to said spindle, wherein said sliding body is a plastic material which is injection molded;

a tubular hollow body, said hollow body being embedded in the region of said longitudinal edge of said sun visor body;

said sliding body being mounted in a manner allowing axial displacement of said sliding body relative to said hollow body, said sliding body being rotationally fixed relative to said hollow body;

said sliding body having outer pressure-exerting elements distributed over a circumference of said sliding body and supporting said sliding body in said hollow body;

said sliding body being formed from a modified molybdenum-enriched POM and having a cutout which is open at the bottom;

a compression spring disposed within said cutout; and a slowing-down block disposed within said cutout, said slowing-down block being subjected to the action of said spring and being supported on a bottom wall of the hollow body.

2. The sun visor of claim 1 wherein said sliding body is comprised of molybdenum POM C 9021 M.

3. The sun visor of claim 1 wherein said slowing-down block is a general E-shape, and wherein a central leg of said E-shape is a stub to accommodate said compression spring.

4. The sun visor of claim 3 wherein said slowing-down block is injection molded and is comprised of molybdenum POM 9021 K.

5. The sun visor of claim 1 wherein said slowing-down block is injection molded and is comprised of molybdenum POM 9021 K.

6. The sun visor of claim 1 wherein a dimensional tolerance spacing between the sliding body and the hollow body is smaller than 0.05 mm.

7. The sun visor of claim 1 wherein a sliding force required to move the sliding body relative to the tubular hollow body is between 7 N and 13 N.

8. The sun visor of claim 1 wherein a dimensional tolerance spacing between the sliding body and the hollow body is smaller than 0.05 mm and wherein a sliding force required to move the sliding body relative to the tubular hollow body is between 7 N and 13 N.

9. A sun visor for vehicles comprising:

a sun visor body having a longitudinal edge;

a spindle, said sun visor body being pivotable about and longitudinally displaceable on said spindle;

a sliding body being rotatable about said spindle and said sliding being secured against axial displacement relative to said spindle, wherein said sliding body is a plastic material which is injection molded;

a tubular hollow body, said hollow body being embedded in the region of said longitudinal edge of said sun visor body;

said sliding body being mounted in a manner allowing axial displacement of said sliding body relative to said hollow body, said sliding body being rotationally fixed relative to said hollow body;

said sliding body having an inner pressure-exerting element acting radially against said spindle, and having outer pressure-exerting elements distributed over a circumference of said sliding body and supporting said sliding body in said hollow body;

said sliding body including a front bearing eyelet and a rear bearing eyelet;

said sliding body defining an accessible elongate cavity;

an elongate metal cage disposed within said sliding body, said metal cage having a base and a top wall, said metal cage accommodating said spindle and bearing said inner pressure-exerting element;

resilient means arranged between said base of the metal cage and said inner pressure-exerting element, said resilient means pressing said inner pressure-exerting element against said spindle, and pressing said spindle against the top wall of said metal cage, said top wall of said metal cage being complementary to the radius of the spindle;

said sliding body being formed from a modified molybdenum-enriched POM, said sliding body having a cutout which is open at the bottom;

a compression spring disposed within said cutout; and a slowing-down block disposed within said cutout, said slowing-down block being subjected to the action of said spring and being supported on a bottom wall of the hollow body.

10. The sun visor of claim 9 wherein said sliding body is comprised of molybdenum POM C 9021 M.

11. The sun visor of claim 9 wherein said slowing-down block is a general E-shape, and wherein a central leg of said E-shape is a stub to accommodate said compression spring.

12. The sun visor of claim 11 wherein said slowing-down block is injection molded and is comprised of molybdenum POM 9021 K.

13. The sun visor of claim 9 wherein said slowing-down block is injection molded and is comprised of molybdenum POM 9021 K.

14. The sun visor of claim 9 wherein a dimensional tolerance spacing between the sliding body and the hollow body is smaller than 0.05 mm.

15. The sun visor of claim 9 wherein a sliding force required to move the sliding body relative to the tubular hollow body is between 7 N and 13 N.

16. The sun visor of claim 9 wherein a dimensional tolerance spacing between the sliding body and the hollow body is smaller than 0.05 mm and wherein a sliding force required to move the sliding body relative to the tubular hollow body is between 7 N and 13 N.

* * * * *